PATENTED JAN 4 1972

INVENTOR.
LOUIS T. KING
BY
Wm. H. Dean

United States Patent

[11] 3,632,080

[72] Inventor Louis T. King
    2401 East Pierson, Phoenix, Ariz. 85016
[21] Appl. No. 823,552
[22] Filed May 12, 1969
[45] Patented Jan. 4, 1972

[54] PRESSURE-BALANCED FLAPPER VALVE
    7 Claims, 7 Drawing Figs.
[52] U.S. Cl............................................. 251/30,
    251/58, 251/228
[51] Int. Cl............................................. F16k 31/40
[50] Field of Search......................................... 251/30,
    228, 298, 169, 58; 74/104

[56] References Cited
    UNITED STATES PATENTS
    961,594   6/1910   Fischer.......................... 251/169
    2,221,269 11/1940  Sertillange.................... 251/298 X
    3,006,596 10/1961  Nelson........................... 251/228 X
    3,062,232 11/1962  McGay........................... 251/298 X
    3,119,594  1/1964  Heggem.......................... 251/298 X
    3,254,660  6/1966  Ray............................. 251/228 X
    3,440,933  4/1969  Sutton........................... 74/104 X
    FOREIGN PATENTS
    824,708    2/1938  France........................... 251/30
    3,699      2/1900  Great Britain................... 251/228

*Primary Examiner*—M. Cary Nelson
*Assistant Examiner*—Richard Rothman
*Attorneys*—Wm. C. Cahill, Samuel J. Sutton and Edwin M. Thomas ABSTRACT: A pressure-balanced flapper valve adapted for use in controlling and/or shutting off flow of various fluids, and comprising novel actuator means including a hollow cylindrical piston adapted telescopically to surround the solenoid control valve so as to provide a very compact valve actuator and control valve means particularly adapted for use in connection with a pressure-balanced flapper valve.

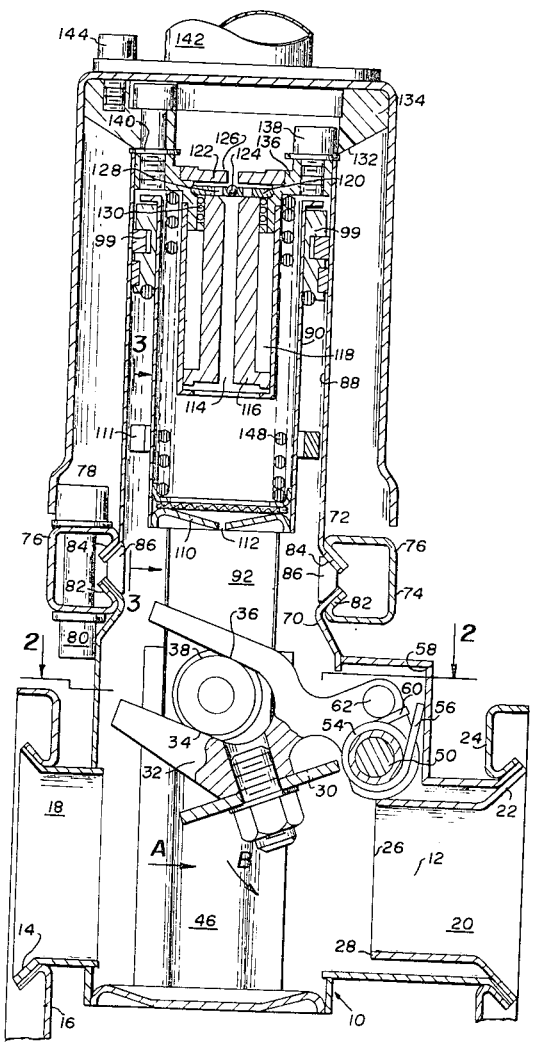

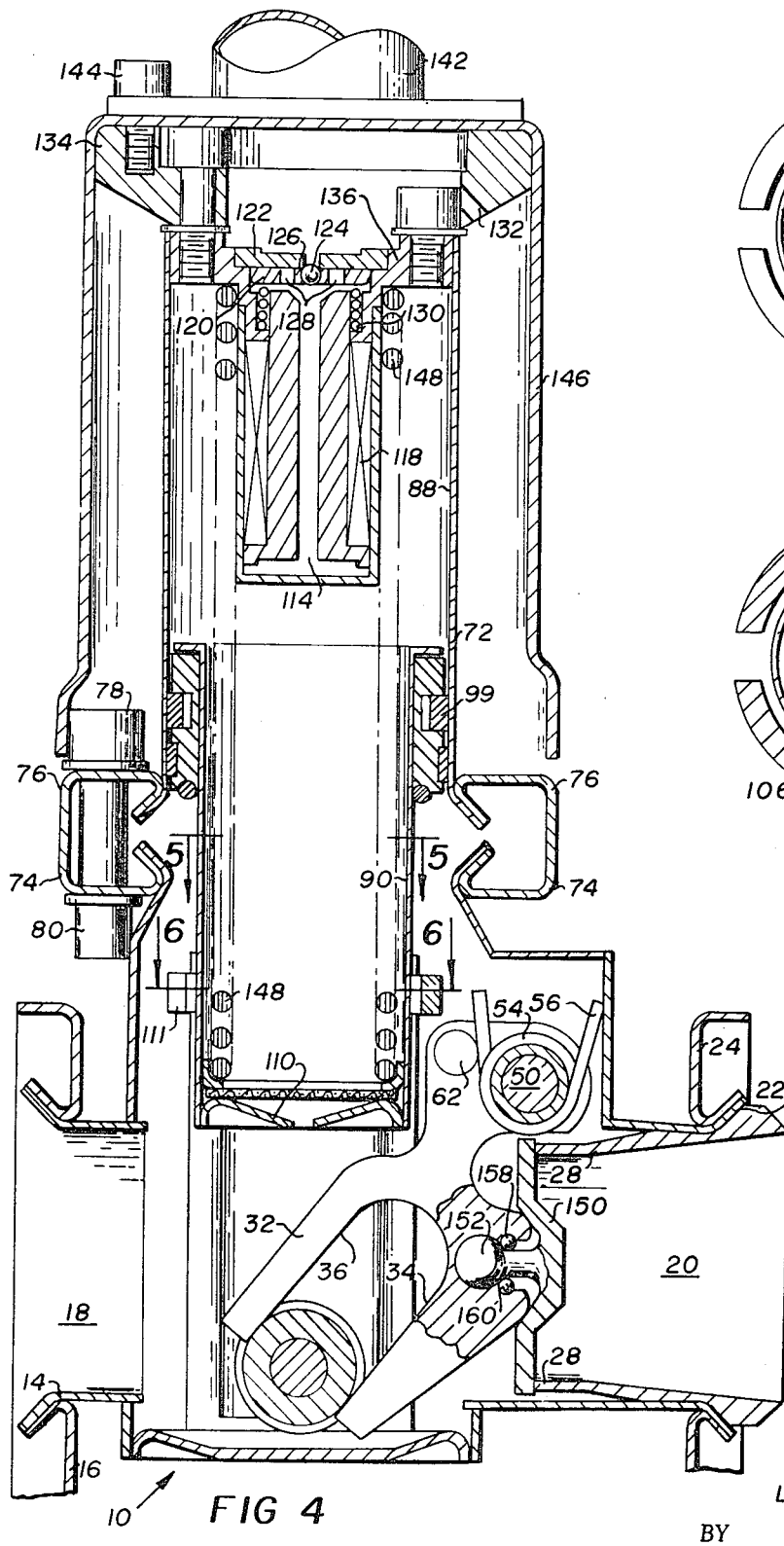
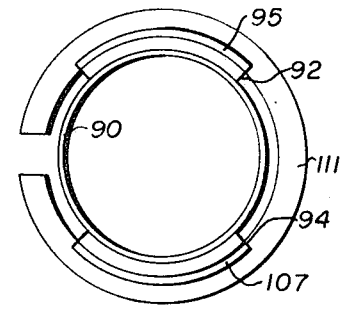
FIG 5
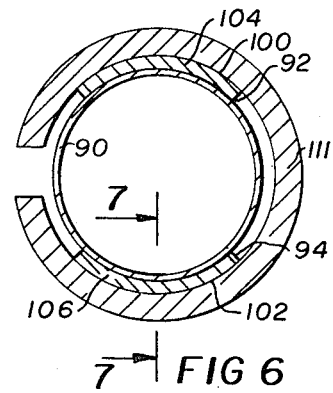
FIG 6
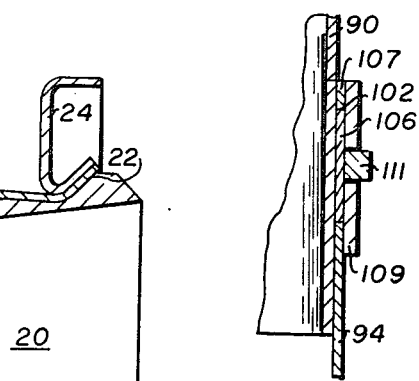
FIG 7
FIG 4
INVENTOR.
LOUIS T. KING
BY
Wm. H. Dean

PRESSURE-BALANCED FLAPPER VALVE

BACKGROUND OF THE INVENTION

Various prior art valves used in pneumatic systems for controlling fluid flow and shutoff have included butterfly or other valve mechanisms which are typically fitted in a frictional relation to a duct or a seat, and such valves having friction to overcome or an opening enclosing are difficult to actuate as balanced valves or as modulating and shutoff valves, and consequently, such valves having attendant opening and closing friction loads require actuators which are quite large in size and of substantial weight. Many of the prior art valves which have a high frictional loading of the valve mechanism at its stationary seat have bulk and weight disadvantages with respect to uses in aircraft, or the like, and the actuators and controls for such valves have been relatively bulky, and difficult to operate particularly in many of the valve controlling functions, as for example, valves functioning to modulate flow or a pressure differential thereacross.

SUMMARY OF THE INVENTION

The present invention comprises a flapper valve mechanism pivotally mounted in a housing on an axis disposed laterally relative to a fluid flow axis through the valve. The flapper being openable and closeable relative to a stationary seat in the housing, and operable by a hollow piston-type actuator which is responsive to fluid pressure, and which is telescopically movable into surrounding relationship with a control valve mechanism used to control a pressure differential relative to the actuating piston which controls the flapper valve of the invention thereby providing a very compact and relatively lightweight valve mechanism, and particularly such a mechanism adapted for use in connection with the balancing and control of flapper valves for various fluid control and shutoff uses.

Accordingly, it is an object of the present invention to provide a very compact, lightweight and efficient valve mechanism particularly adapted for use in aircraft, or the like, where light and bulk is critical.

Another object of the invention is to provide a novel valve mechanism including a pressure balanced flapper valve having a hollow piston-type actuator and control valve therefor so located with respect to each other that the hollow piston actuator may telescopically surround the control valve mechanism which controls a pressure differential relative to the piston which actuates the flapper valve.

Another object of the invention is to provide a pressure balanced valve mechanism which is particularly applicable to solenoid operated shutoff valves, low force externally operated valves, low force temperature control valves, low force pressure regulators, slow operational check valves, and low force modulating valves.

Another object of the invention is to provide a valve mechanism having very desirable functional characteristics when the valve mechanism must perform with a minimum pressure drop, a minimum leakage at the valve seat, and without pneumatic leakage across the valve actuating piston.

Another object of the invention is to provide a valve mechanism having minimum frictional forces when operated in or near the closed position.

Another object of the invention is to provide a valve mechanism of lightweight construction due to a low stress condition of the port seal members and relative freedom of the valve members to maintain a seal even though the main housing structure of the valve mechanism may be under severe strain.

Another object of the invention is to provide a novel flapper valve having a universal joint mechanism between the flapper carrying member and the flapper valve so that it may readily compensate for angular displacement and insure efficient sealing of the flapper valve against its seat when in closed position.

Another object of the invention is to provide a valve mechanism, wherein valve seats and valve flapper members may be replaced without completely disassembling the valve or removing it from an installation.

Further objects and advantages of the invention may be apparent from the following specification, appended claims, and accompanying drawings:

BRIEF DESCRIPTION OF THE DRAWINGS

FIG. 4 is a view similar to FIG. 1, but showing the valve mechanism of the invention in closed position, and further showing slight modifications of the flapper valve and its mounting mechanism;

FIG. 5 is a fragmentary sectional view taken from the line 5—5 of FIG. 4;

FIG. 6 is a fragmentary sectional view taken from the line 6—6 of FIG. 4; and

FIG. 7 is a fragmentary sectional view taken from the line 7—7 of FIG. 6.

DESCRIPTION OF THE PREFERRED EMBODIMENTS

Figure 1:
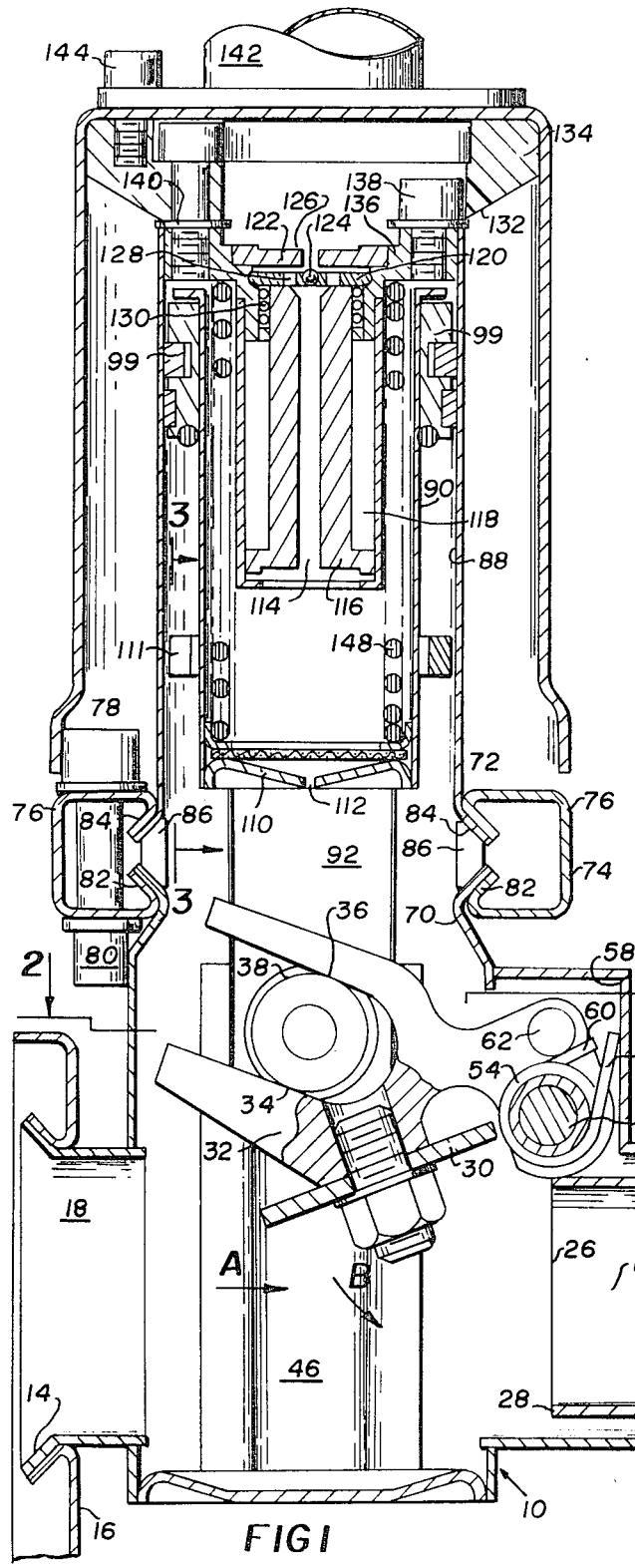
FIG. 1 is an axial sectional view of a valve mechanism of the invention showing parts and portions thereof in elevation to facilitate the illustration, and showing portions further broken away and in section to amplify the illustration.

As shown in FIG. 1, a valve mechanism of the invention comprises a housing 10 which is preferably a lightweight housing made of thin walled stainless steel tubing, or the like. This housing is provided with a flow passage therethrough having a flow axis generally designated 12, and the housing 10 is provided with a flared inlet fitting 14 having a coupling flange 16 connected therewith for the purpose of connecting the valve to a conduit or supply of fluid under pressure. Thus, the valve of the invention is provided with an inlet 18 and an outlet 20. The outlet 20 comprises a flared tubular member 22 having an annular coupling flange 24 connected therewith, and this flange 24 is adapted to be coupled with a suitable conduit into which the valve of the invention delivers fluid, under pressure. The flared fitting 22 is provided with an inlet end 26 having an annular valve seat portion 28 against which a flapper valve member 30 is adapted to seat for shutting off flow through the valve in the direction of an arrow A, as shown best in FIG. 1 of the drawings. The flapper valve member 30 is carried by a yoke 32 having a pair of opposed bearing engaging surfaces 34 and 36 which are generally parallel to each other and which engage a circular bearing 38. The bearing engaging surfaces 34 and 36 are elongated and adapted to provide cam roller engaging surfaces for the roller 38 which is mounted on a shaft 40 having bearing guide rollers 42 and 44 mounted on opposite ends thereof, as shown best in FIG. 2 of the drawings. It will be seen that the shaft 40 passes through a central opening in the roller 38 and that opposite ends of the shaft 40 are disposed in central openings in the rollers 42 and 44 which are adapted to rotate relative to the shaft 40.

Channel-shaped rectilinear tracks 46 and 48 are disposed in opposition to each other and secured in the housing 10 and these tracks are longitudinally disposed at substantially right angles to the flow axis 12 of the fluid flow passage of the valve mechanism of the invention. Thus, the rollers 42 and 44 are adapted to traverse within the channel-shaped tracks 46 and 48 in directions at substantially right angles to the fluid flow axis 12 of the valve of the invention.

Figure 2:
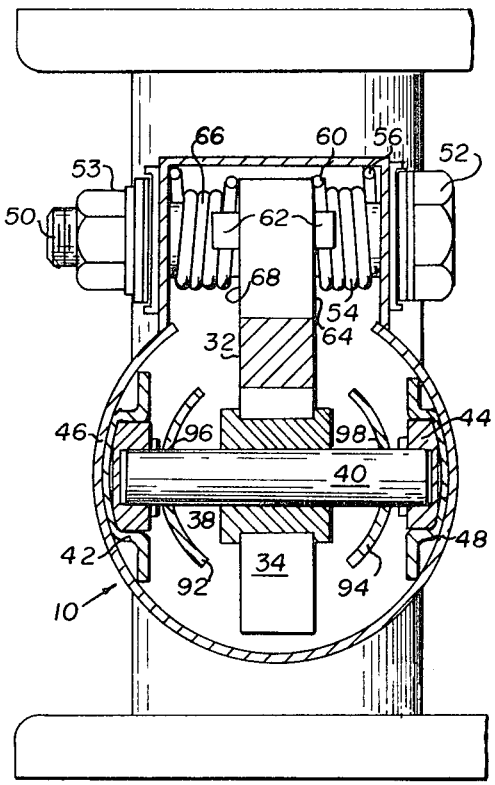
FIG. 2 is a fragmentary sectional view taken from the line 2—2 of FIG. 1.

The yoke 32 is pivotally mounted about the axis of a shaft 50. This shaft 50, as shown in FIG. 2, comprises a bolt head 52 disposed at one outer side of the housing 10 while a nut 54 is screw threaded on the opposite end of the bolt and is disposed adjacent an opposite side of the housing 10. Thus, the shaft portion 50 of the bolt is held in stationary position in the housing and having its axis disposed at substantially right angles to the flow axis 12 and the axis of the shaft 50 is offset laterally out of the fluid flow path so as to permit pivotal movement of the yoke 32 into the position, as shown in FIG. 1.

In this position, a coil spring 54 is stressed in a helical condition around the axis of the shaft 50 and tends to move the yoke 32 in the direction of an arrow B and to move the flapper valve 30 toward a closed position against the annular seat 28.

One end 56 of the spring 54 engages an inner sidewall portion 58 of the housing 10 and an opposite end 60 of the spring 54 engages a projecting pin 62 which extends through the yoke 32, all as shown best in FIG. 1 of the drawings.

As shown in FIG. 2 of the drawings, the spring 54 is disposed at one side 64 of the yoke 32, and another similar coil spring 66 is disposed at an opposite side 68 of the yoke 32 so that the yoke is straddled by the springs 54 and 66 both of which tend to move the flapper valve member 30 toward a closed position relative to the seat 28.

The housing 10 is provided with an annular neck portion 70 which is coupled to an actuator cylinder 72 by means of a pair of respective annular flanges 74 and 76 clamped together by bolts 78 and internally screw threaded nuts 80. The annular portion 70 is provided with a flared annular portion 82 and an adjacent end of a cylinder 72 is provided with the flared portion 84 and a seal ring 86 of annular form is disposed between the flared portions 82 and 84 so as to provide abutment for the clamping of the flared portions 82 and 84 when held by the bolts 78 and the clamp rings 74 and 76.

The cylinder 72 is provided with a piston carrying bore 88 in which an actuating cylinder 90 is reciprocally mounted.

The piston 90 is a hollow tubular structure, as shown best in FIGS. 5 and 6 of the drawings, and connected to this hollow tubular piston 90 are arms 92 and 94, shown best in FIG. 2 of the drawings. These arms 92 and 94 are provided with openings 96 and 98, respectively, through which the shaft 40 extends so that the piston is coupled to the shaft 40 and therefore capable of actuating the bearing 38 engaged by the yoke 32, and also for moving the rollers 42 and 44 in a rectilinear path as established by the tracks 46 and 48.

The piston 90 is provided with peripheral piston seal rings 99 which are slidingly and sealingly engaged with the bore 88 of the cylinder 72 so as to provide for efficient pneumatic operation of the piston 90 in the cylinder 88 as the piston 90 is longitudinally and sealingly slidable in the bore 88 of the cylinder 72, as will be hereinafter described in detail.

Figure 3:
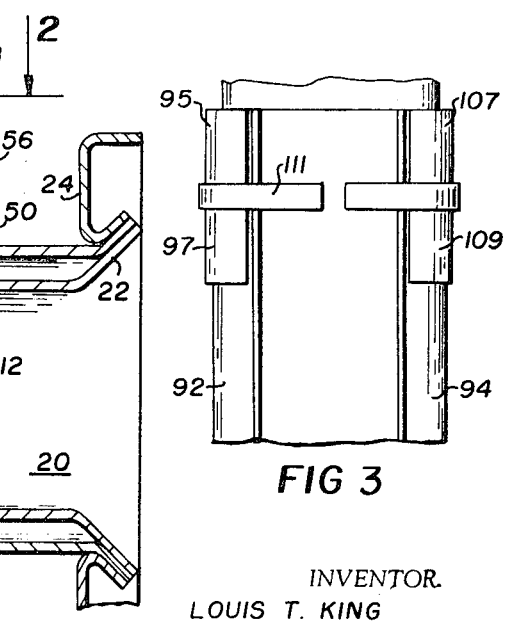
FIG. 3 is a fragmentary view taken from the line 3—3 of FIG. 1, showing internal parts of the valve mechanism of the invention in elevation.

The arms 92 and 94, as shown in FIG. 6 of the drawings, are provided with openings 100 and 102 therein which are fitted over plates 104 and 106, respectively. These plates being fixed to the outside of the piston 90 and as shown in FIGS. 3 and 5 of the drawings, the arms 92 and 94 are provided with spaced retainer plates 95, 97, 107, and 109. These plates are fixed to the arms 92 and 94 and are so spaced as to receive a retainer ring 111 therebetween. This retainer ring 111 is a snap ring and thus holds the arms 92 and 94 securely against the opposite sides of the hollow piston 90, and with the openings 100 and 102 in surrounding relation with the fixed plates 104 and 106 on opposite sides of the cylinder 90.

The piston 90 is provided with an end 110 which communicates with the fluid flow path along the axis 12. The end 110 of the piston 90 is provided with a small diameter fluid flow control orifice 112. This orifice 112 communicates through the center 114 of a solenoid armature 116 which is energizeable by a coil 118 wrapped therearound. A control valve plate 120 is magnetically movable by the armature 116, when energized, and this plate is engaged with an end of the armature 116 located adjacent to a valve plate 122. The magnetically operable valve plate 120 carries a small ball valve 124 adapted to seat at the peripheral edge of a control flow passage 126.

Surrounding the ball 124 are bypass passages 128 and engaged with the plate 120 is a coil spring 130 which tends to force the plate 120 toward the valve plate 122 and to cause the ball 124 to close the fluid flow control opening 126.

When the coil 118 is energized, the valve plate 120 is magnetically pulled away from the plate 122 to allow fluid to flow through the opening 114 in the armature 116 and through the openings 128 and the plate 120, and to vent pressure fluid from the interior of the piston 90 and outwardly through an exhaust opening 132 in a housing end structure 134 coupled to and generally enclosing a normally outer end of the cylinder 88.

The solenoid valve comprising the armature 116, coil 118 and the valve plates 120 and 122 constitute a control valve for the valve mechanism of the invention, and are all mounted on a flange plate 136 secured by bolts 138 to a flange 140 directed inwardly at the end of the cylinder 88.

Also bolted to the flange plate 136 is the member 134 which carries an electrical plug fitting 142, and this fitting 142 is secured by bolts 144 to the member 134 and also clamped in place a cup-shaped cover 146 which covers and surrounds the cylinder 88.

It will be seen that the small control orifice 112 in the end of the piston 90 is smaller than the flow control opening 126 of the control valve operated by the solenoid 118.

Under operating conditions of the mechanism, as shown, fluid pressure in the fluid flow path along the axis 12 communicates through the small orifice 112 in the piston 90, and when the ball valve 124 is seated against the peripheral seat of the orifice 126, pressure equalizes at opposite sides of the piston 90 and force of a spring 148 together with that of the springs 54 and 66 tend to move the flapper valve 30 toward closed position on the seat 26, and upstream fluid pressure then acts to hold the flapper valve 30 closed against the seat 26.

When it is desired to open the valve member 30 relative to the seat 26, the solenoid coil 118 is energized and the valve plate 120 is attracted by the armature 116 so as to pull the ball 124 from the seat 126, and to allow the fluid pressure to be bled off through the vent opening 132. The opening surrounding the seat 126 being larger than the orifice 112 allows fluid pressure to bleed off from the opposite side of the piston from that exposed to pressure fluid in the fluid flow path along the axis 12, and the area of the piston being greater than the area of the flapper valve 30 creates sufficient force to overcome compression of the springs 148 and the springs 54 and 66, together with the pneumatic pressure on the flapper valve 30, and thus forces the shaft 40, together with the roller 38, to cam the yoke 34 to the open position, as shown in FIG. 1.

Due to the fact that the area of the piston is substantially greater than that of the flapper valve 30, pneumatic force or upstream pressure of fluid relative to the flapper valve 30 is always capable of overcoming the pneumatic force on the flapper valve tending to hold it closed, and also the force of the hereinbefore mentioned springs.

It will be appreciated by those skilled in the art that the valve of the invention is thus pneumatically balanced when considering the operation of the solenoid control valve which controls a pressure differential across the piston 90. Further, it will be appreciated by those skilled in the art that a great variety of functional characteristics of the valve mechanism of the invention may be accomplished by a reverse operation of the solenoid valve of the invention, and also the sensing of downstream pressure to accomplish various control functions of the valve.

It will be appreciated by those skilled in the art that the flapper valve of the invention does not have substantial frictional loading conditions upon closing or opening, and therefore the pneumatic balance of the valve and the pneumatic control of the valve may be effected by the piston 90 which is relatively small and compact as compared to many pneumatic actuators which must not only pressure balance a pneumatic valve member, but overcome frictional forces involved in the sealing closure mechanism of the valve. This is particularly true with respect to some butterfly-type valves.

The valve mechanism of the invention is particularly compact due to the disposition of the solenoid valve in the cylinder 72, such that the solenoid valve is surrounded by the hollow piston 90, and the spring 148 when the valve is in the open position, as shown in FIG. 1 of the drawings.

It will be appreciated by those skilled in the art that the telescopic surrounding relation of the hollow cylindrical piston 90 relative to the solenoid 118 provides for a very compact pressure balanced valve which is electrically controllable, and that the relationship of the piston 90 to upstream pressure and the area of the flapper valve 30, as well as the force of the springs 54, 66 and 148, provides a novel arrangement also contributing to compactness, lightweight, and operational versatility of the valve mechanism of the invention.

The compact control system of the valve mechanism of the invention involving the opening 112 in the piston 90 and the solenoid control valve telescopically surrounded by the hollow piston 90 all contributes to the compactness and lightweight of the valve, and particularly adapted for use in aircraft or other critical installations.

As shown in FIG. 4, the valve mechanism of the invention to in closed position, and the disclosure comprises a modification of the flapper valve member 30. The modified flapper valve member being designated 150. This flapper valve member 150 is provided with a central shank 152 having a spheroid end portion 154 seated in a conforming socket 156 in the yoke 32. A pair of pins 158 and 160 are disposed in pressed position in the yoke 32 and in interferring relation with the ball portion or spherical portion 150 to prevent displacement thereof when the yoke is moved in a position to open the flapper valve member 150 relative TO the seat 28.

The spherical ball portion 150 and conforming socket 156 provide a universal joint connection between the yoke 32 and the flapper valve member 150 so as to compensate for angular misalignment which may be provided by the mounting of the yoke 32 and/or the mounting of the seats 28 relative to the housing 10. This universal joint connection insures accurate sealing of the flapper valve 150 on the seat 28, and it will be understood that the seat 28 may be a knife edge seat capable of sealing efficiently at very low fluid pressures existing in the upstream area of the valve mechanism of the invention. It will be noted that in FIG. 4 of the drawings, the valve plate 120 is shown forced against the valve plate 122 by the spring 130 so as to seat the ball 24 on the peripheral edge of the opening 126 and to thereby equalize pressure across the piston 90 so that the force of the spring 148, together with the springs 54 and 66, may initially move the yoke 32 and flapper valve member 150 onto the seat 28 whereupon fluid pressure in the flow passage of the valve may act to further firmly seat the flapper valve member 150 on the annular seat 28.

It will be obvious to those skilled in the art that various modifications may be resorted to within the spirit of the invention.

I claim:

1. In a valve mechanism, the combination of: a housing having a fluid flow passage therethrough; said passage adapted to conduct fluid, under pressure; a flapper valve member pivoted relative to said passage; seat means in said housing disposed and adapted to be engaged by said flapper valve member for shutting off and/or controlling the flow of fluid through said passage; first means pivotally supporting said flapper valve on a pivotal axis disposed laterally relative to said flow passage; said first means provided with a yoke having a pair of opposed elongated bearing engaging surfaces; a bearing disposed and engageable between said bearing engaging surfaces; a pair of bearing guide members connected to said bearing and located in opposed spaced relation thereto; a pair of spaced tracks in said housing and disposed at an angle to said flow passage; said bearing guide members movably disposed and adapted to move in a rectilinear relationship to said tracks; an actuator piston coupled to said bearing and said bearing guide members; an actuator cylinder coupled to said housing and having a bore adapted slidingly and sealingly to hold said piston; a first portion of said piston exposed to fluid pressure in said fluid passage and tending to move said flapper valve toward an open position relative to said seat; one side of said flapper valve exposed to fluid pressure in said passage tending to hold said flapper valve closed on said seat; small area passage means for conducting said fluid pressure from said passage to a second portion of said piston disposed in opposition to said first portion thereof which is exposed to fluid pressure in said fluid passage; and control valve means communicating with the interior of said cylindrical and said second portion of said piston; said control valve disposed to vent said cylinder and having flow capacitor operable relative to said small area passage means to vary a pressure differential relative to said first and second portions of said piston said control valve is a solenoid valve disposed in said cylinder; said piston being hollow and telescopically disposable in surrounding relation with said solenoid valve when said piston moves in one direction in said cylinder.

2. The invention, as defined in claim 1, wherein: said bearing is a roller, said bearing guide members are rollers, and said tracks are channel shaped in cross section members; said last-mentioned rollers being disposed to roll in said channel shaped in cross section tracks.

3. In a valve mechanism, the combination of: a housing having a fluid flow passage therethrough; said passage adapted to conduct fluid, under pressure; a flapper valve member pivoted relative to said passage; seat means in said housing disposed and adapted to be engaged by said flapper valve member for shutting off and/or controlling the flow of fluid through said passage; first means pivotally supporting said flapper valve on a pivotal axis disposed laterally relative to said flow passage; said first means provided with a yoke having a pair of opposed elongated bearing engaging surfaces; a bearing disposed and engageable between said bearing engaging surfaces; a pair of bearing guide members connected to said bearing and located in opposed spaced relation thereto; a pair of spaced tracks in said housing and disposed at an angle to said flow passage; said bearing guide members movably disposed and adapted to move in a rectilinear relationship to said tracks; an actuator piston coupled to said bearing and said bearing guide members; an actuator cylinder coupled to said housing and having a bore adapted slidingly and sealingly to hold said piston; a first portion of said piston exposed to fluid pressure in said fluid passage and tending to move said flapper valve toward an open position relative to said seat; one side of said flapper valve exposed to fluid pressure in said passage tending to hold said flapper valve closed on said seat; small area passage means for conducting said fluid pressure from said passage to a second portion of said piston disposed in opposition to said first portion thereof which is exposed to fluid pressure in said fluid passage; and control valve means communicating with the interior of said cylinder and said second portion of said piston; said control valve disposed to vent said cylinder and having flow capacity operable relative to said small area passage means to vary a pressure differential relative to said first and second portions of said piston; a pair of spaced arms are connected to said piston and extend therefrom; said pair of bearing guide members disposed adjacent said arms; said yoke disposed between said arms; and a shaft coupled to said bearing, said arms, and said bearing guide members.

4. The invention, as defined in claim 3, wherein: said bearing is a roller, said bearing guide members are rollers, and said tracks are channel shaped in cross section, and said last-mentioned rollers are disposed to roll in said channel shaped in cross section tracks.

5. In a valve mechanism, the combination of: a housing having a fluid flow passage therethrough; said passage adapted to conduct fluid, under pressure; a flapper valve member pivoted relative to said passage; seat means in said housing disposed and adapted to be engaged by said flapper valve member for shutting off and/or controlling the flow of fluid through said passage; first means pivotally supporting said flapper valve on a pivotal axis disposed laterally relative to said flow passage; said first means provided with a yoke having a pair of opposed elongated bearing engaging surfaces; a bearing disposed and engageable between said bearing engaging surfaces; a pair of bearing guide members connected to said bearing and located in opposed spaced relation thereto; a pair of spaced tracks in said housing and disposed at an angle to said flow passage; said bearing guide members movably disposed and adapted to move in a rectilinear relationship to said tracks; an actuator piston coupled to said bearing and said bearing guide members; an actuator cylinder coupled to said housing and having a bore adapted slidingly and sealingly to hold said piston; a first portion of said piston exposed to fluid pressure in said fluid passage and tending to move said flapper valve toward an open position relative to said seat; one side of said flapper valve exposed to fluid pressure in said passage tending to hold said flapper valve closed on said seat; a pair of spaced arms connected to said piston and extending therefrom; said pair of bearing guide members disposed adjacent said arms; said yoke disposed between said arms; and a shaft coupled to said bearing, said arms, and said bearing guide members.

6. The invention as defined in claim 5, wherein said bearing is a roller, said bearing guide members are rollers, and said tracks are channel shaped in cross section, and said last-mentioned rollers are disposed to roll in said channel shaped in cross section tracks.

7. In a valve mechanism, the combination of: a housing having a fluid flow passage therethrough; said passage adapted to conduct fluid, under pressure; a flapper valve member pivoted relative to said passage; seat means in said housing disposed and adapted to be engaged by said flapper valve member for shutting off and/or controlling the flow of fluid through said passage; first means pivotally supporting said flapper valve on a pivotal axis disposed laterally relative to said flow passage; said first means provided with a yoke having a pair of opposed elongated bearing engaging surfaces; a bearing disposed and engageable between said bearing engaging surfaces; a pair of bearing guide members connected to said bearing and located in opposed spaced relation thereto; a pair of spaced tracks in said housing and disposed at an angle to said flow passage; said bearing guide members movably disposed and adapted to move in a rectilinear relationship to said tracks; an actuator piston coupled to said bearing and said bearing guide members; an actuator cylinder coupled to said housing and having a bore adapted slidingly and sealingly to hold said piston; a first portion of said piston exposed to fluid pressure in said fluid passage and tending to move said flapper valve toward an open position relative to said seat; one side of said flapper valve exposed to fluid pressure in said passage tending to hold said flapper valve closed on said seat; a pair of spaced arms connected to said piston and extending therefrom; said pair of bearing guide members disposed adjacent said arms; and a shaft coupled to said bearing, said arms, and said bearing guide members.

* * * * *